Sept. 19, 1967 T. WALTERS 3,342,510
COUPLING
Filed Sept. 22, 1964 2 Sheets-Sheet 1

Tom Walters
INVENTOR.

BY Clarence A. O'Brien
and Harvey B. Jacobson
Attorneys

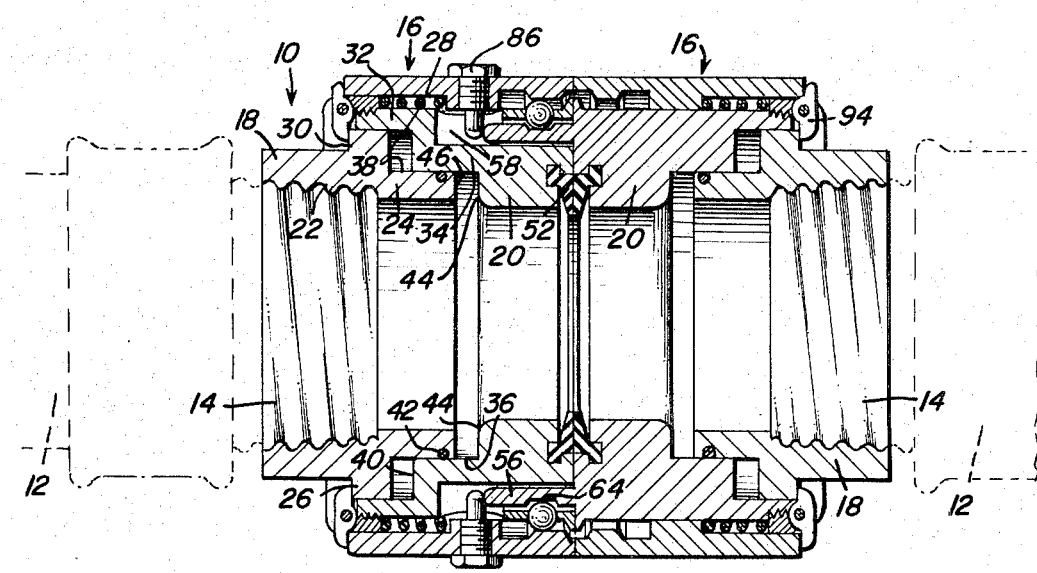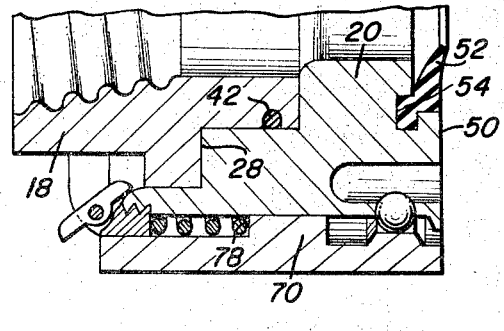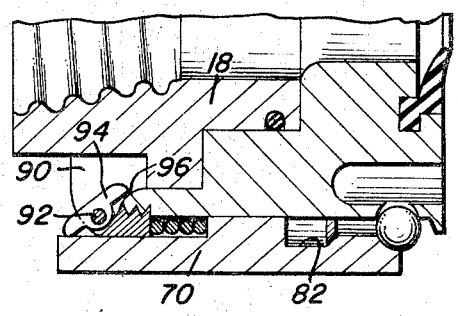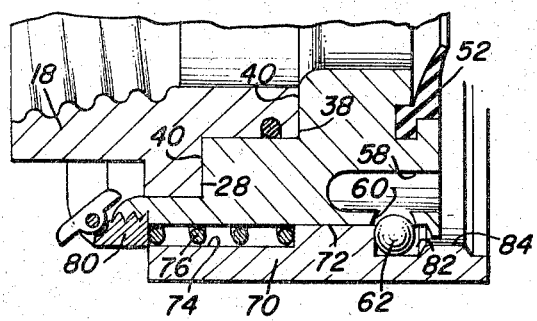
Tom Walters
INVENTOR.

United States Patent Office 3,342,510
Patented Sept. 19, 1967

3,342,510
COUPLING
Tom Walters, Mason Blvd., Point Pleasant,
W. Va. 25550
Filed Sept. 22, 1964, Ser. No. 398,261
6 Claims. (Cl. 285—83)

This invention comprises a novel and useful coupling and more particularly relates to a pipe or hose coupling comprising a pair of identical, interchangeable components.

A primary object of the invention is to provide a coupling assembly having a coupling action which is readily engaged or disengaged entirely by an axial pull or thrust of the components.

A further important object of the invention is to provide a coupling assembly having an easily engaged and disengaged but extremely secure positive locking of the components in their assembled relation.

A further object of the invention is to provide a coupling assembly in accordance with the immediately preceding object, wherein an independently operable manual control element effects positive actuation of the coupling lock means.

Yet another purpose of the invention is to provide a coupling assembly in accordance with the foregoing objects which shall include a pressure responsive locking means operable in response to the existence of fluid pressure within the coupling to positively prevent unlocking or releasing of the coupling components.

A still further purpose of the invention is to provide a coupling assembly consisting of a pair of identical cooperating components capable of being readily interengaged with each other and which shall have an inherent self-lining and orienting operation in the engaging of the two components to form a coupled joint.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a vertical central longitudinal sectional view through the coupling in the connected and operative position of the components;

FIGURE 4 is a detailed view taken upon an enlarged scale and showing a coupling component in connected position but with the pressure lock disengaged;

FIGURE 5 is a view similar to FIGURE 4 but with the control ring positioned to release the coupling lock;

FIGURE 6 is a view similar to FIGURE 4 with the control ring shifted to a cocked position in readiness for the next coupling operation; and, FIGURE 7 is an exploded perspective view of the elements of one of the two identical coupling components in accordance with this invention.

Figure 1:
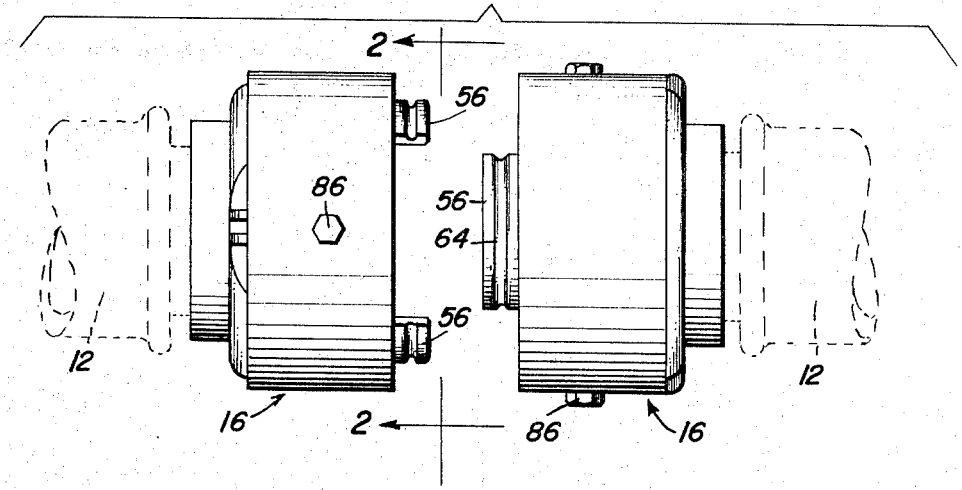
FIGURE 1 is a side elevational view of the coupling components of the coupling assembly in a separated relation but aligned for a coupling engagement, the hose sections to which the components are secured being shown in phantom therein.

In the accompanying drawings, the numeral 10 designates generally the coupling assembly in accordance with this invention. Indicated in phantom and by the numerals 12 are a pair of hose or conduit sections which are to be detachably coupled together by the coupling assembly 10. For this purpose there are provided the usual externally threaded metallic fittings 14 on the ends of the sections 12.

Figure 2:
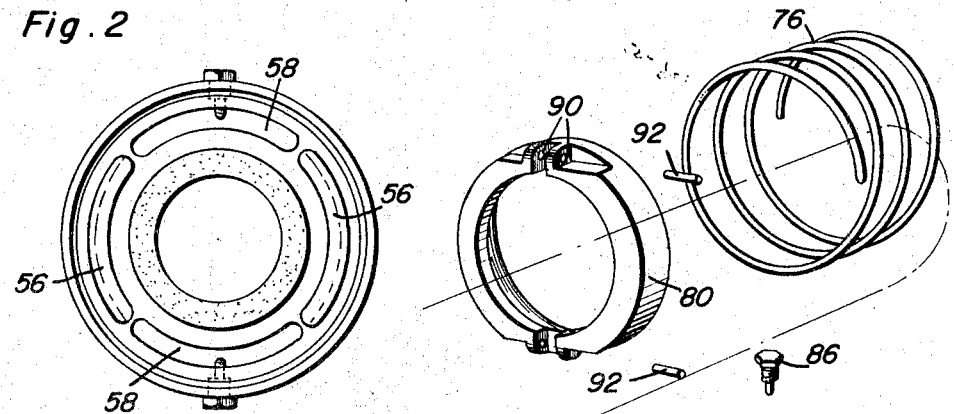
FIGURE 2 is an end elevational view of one of the coupling components being taken substantially upon the vertical plane indicated by the section line 2—2 of FIGURE 1 and rotated at 90° to the position of FIGURE 1.
Figure 7:
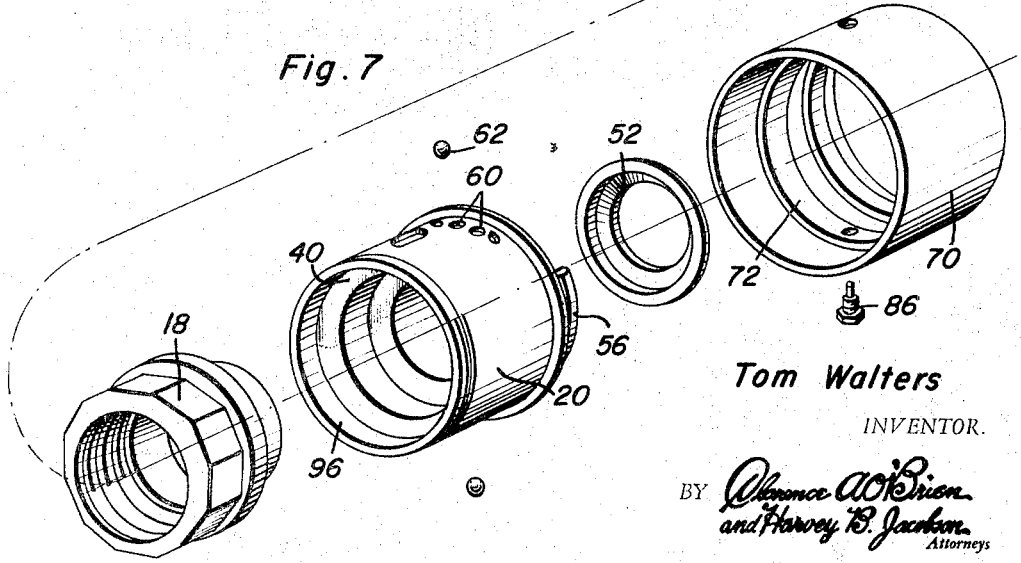

Referring now to FIGURES 1 and 3 in particular, it will be observed that the coupling assembly 10 comprises two complementary and preferably identical coupling components each indicated generally by the numeral 16. Each coupling component 16 includes a pair of relatively movable members comprising an anchor member 18 upon which is axially slidably disposed a coupling member 20. Each of these members is of a ring-like or sleeve-like character, the anchor member 18 having an internally threaded bore 22 by which it is removably but fixedly secured upon the threaded extremity 14 of the associated conduit section 12. The anchor member 18 has a diametrically reduced cylindrical end portion 24 together with an intermediate radially enlarged circumferentially extending rib or flange 26 having parallel annular planar faces 28 and 30 upon its opposite sides and which join the two sleeve-like extremities thereof. As shown in FIGURE 2, each of the anchor members 18 and coupling members 20 have axially aligned bores therethrough which form a continuation of the passages in the conduit sections 12.

Referring next to the coupling member 20, it will be observed that each of these has a diametrically enlarged cylindrical sleeve 32 at its rearward end which telescopingly slides over and is guidingly embraced upon the rib or enlargement 26. Extending forwardly from the sleeve 32 is a diametrically reduced cylindrical sleeve or main body portion of the coupling member indicated by the numeral 34, this sleeve in turn having a cylindrical internal surface 36 which is slidably engaged upon the corresponding cylindrical external surface 38 of the coupling member portion 24. A planar face 40 is provided at the junction of the internal cylindrical surface of the sleeve 32 and the cylindrical portion 34. As will be evident by a comparison of FIGURE 3 with FIGURES 4–6, the planar surfaces 28 and 40 are parallel to each other and constitute cooperating abutment or stop surfaces which limit the sliding movement of the two coupling members towards each other.

A sealing means in the form of an O-ring 42 is provided upon one of the cylindrical surfaces 38 or 36 to establish a fluid tight seal therebetween.

At its forward end, the surface 36 is provided with an annular surface or shoulder 44 which constitutes with the adjacent planar surface 46 of the anchor member end portion 24 a pair of engageable or abutting plane surfaces which constitute stop surfaces and which prevent sliding movement of the coupling and anchor members towards each other as will be apparent from a consideration of FIGURES 4–6.

With continuing reference to FIGURES 3–6, it will be noted that the forward end of the coupling member 20 has a planar surface 50 which is complementary to and mates with the corresponding surface of the other complementary coupling member 20 in a face-to-face engagement when the parts are in their fully coupled position. However, in order to effect a fluid tight seal between the engaging surfaces 50, there are also provided a pair of flexible sealing elements 52 which may be in the form of sealing rings received in corresponding channels or grooves 54 in the surfaces 50. The arrangement is such that when the two surfaces are drawn into face-to-face engagement, the sealing rings 52 will engage each other to complete a fluid tight seal between the two assembled coupling members.

Means is provided for aligning the coupling members in locked engagement. Thus, projecting forwardly from each of the faces 50 of each coupling member are a pair of arcuate projections 56. As shown in FIGURE 2, preferably two such diametrically oppositely disposed projections are provided, each projection extending substantially through a quadrant of the circumference of the coupling member. Disposed between the two projections 56 are a pair of recesses or cavities 58 similarly disposed and of similar extent. The arrangement is such that when the two coupling members are moved axially towards each other from the position shown in FIGURE 1 to that shown in FIGURE 3, the projections 56 of one member will engage in the corresponding recesses 58 of the other member. The circumferential extent of the projections and recesses is such that when the projections 56 of one coupling member are moved axially and positioned between the corresponding projections of the other coupling member, they will orient these members and rotationally align them so that the corresponding projections may be received in the corresponding complementary recesses of the other coupling member.

A locking means is provided for securing and maintaining the projections interlocked in the complementary recesses of the other complementary coupling member. For this purpose, the outer wall of each recess 58 is provided with a slot or opening 60 therein and a locking element in the form of a ball 62 is movable at least partially through this opening and at least partially into the interior of the recess 58. In addition, the exterior surface of each of the projections is provided with a circumferentially extending channel locking surface or groove 64 into which the locking balls 62 are adapted to engage and when retained therein will prevent withdrawal of the projections from the corresponding locking recesses.

A manual control means is provided for positively locking or releasing the locking balls from the projections. This locking means comprises a control sleeve 70 which is axially slidable upon the exterior cylindrical surface of the sleeve portion 32 of each coupling member.

As shown best in FIGURES 4–6, each control sleeve 70 is provided with an axial bore forming an annular bearing surface 72 through which it is slidably mounted upon the exterior surface of the coupling member 20. This bore 72 is in turn diametrically reduced or counterbored as at 74 to provide an annular chamber in which is received a compression spring 76 abutting against a shoulder or annular wall 78 provided at the inner end of the counterbore 74 and a threaded retaining nut 80 at the inward end of the exterior surface of the coupling member. This spring urges the control sleeve outwardly of the coupling member and towards an abutting engagement with the corresponding control sleeve on the other coupling member of the complementary coupling component, this engaged position being shown in FIGURE 3.

The control sleeve also has a further counterbore 82 at its other end together with an inwardly projecting annular rib or cam element 84. The annular rib or cam surface 84 comprises an actuating cam which upon axial sliding movement of the sleeve towards the left as viewed in FIGURES 4–6 will engage the locking balls 62, move them radially inwardly through the openings 60 and into the recesses 58 to engage in the corresponding locking channels 64 of the coupling member projections.

There are further provided a pair of removable retaining pins or bolts 86 which are threadedly engaged in bores in the control sleeves 70 and projecting through the recesses 58. These pins will engage the ends of the projections upon the inward movement of the latter into a recess and will also prevent the springs 76 from entirely urging the control sleeves 70 off of the corresponding and associated coupling member when the coupling components are disengaged from each other in the position shown in FIGURE 1.

In this form of the invention there is further provided an automatic pressure operated locking means which will positively prevent unlocking of the coupling members when the interior of the conduit sections are subjected to pressure as by being filled with a fluid flowing therethrough. This pressure operated locking means consists of radially outwardly projecting lugs 90 which are carried by the retaining rings 80 and which by means of pivots 92 carry each a locking lever 94. One end of this lever cooperates with the flaring surface 96 at the extremity of the coupling member 20 while the other end thereof abuts against the inner surface of the counterbore 74 of the control sleeve as shown in FIGURE 5.

The operation of the automatic locking means is as follows.

With the two anchor components 18 secured to the adjacent ends of a pair of conduit sections 12 which are to be detachably connected together, and with the corresponding coupling components 20 slidably mounted upon the anchor components it will be understood that the coupling components are urged by their springs 76 to their extreme outward position which is limited by engagement of the stop or fastener pins 86 against the end wall of the recesses 58. The two components are then brought toward each other as shown in FIGURE 1 with the projections 56 of one component being disposed between the corresponding projections of the other component. A straight axial thrust of the components toward each other causes the projections 56 of each component to penetrate into the corresponding complementary recesses 58 of the other component. During this movement, the lock balls 62 are free to move radially outwardly into the counterbore 82 of the control sleeve 70, which counterbore provides sufficient clearance to enable the projections 56 to pass inwardly or radially inwardly of the locking balls 62 as shown in FIGURE 6. This axial thrust of the two coupling components towards each other continues until the two sealing rings 52 engage each other at the time the surfaces 50 of the two coupling components abut each other. This is the locked position shown in FIGURE 3. During this axial movement of the two components towards each other, the two control sleeves 70 engage each other and are moved backwardly upon their corresponding mounting components against the resistance of their springs 76. This backward movement causes the rib or cam surface 84 of the locking sleeve to engage the locking balls 62 and urge them inwardly, into the now registering locking channels or grooves 64 of the projections. At the same time, the sliding movement of the locking sleeve against the resistance of the spring upon the mounting members causes the locking dog or lever 94 to pivot about its pivot pin 92 as it is engaged and rotated by the inward extremity of the locking sleeve. The parts are now locked and the pressure responsive lock is engaged.

The locked position of the mounting and anchor members is shown clearly in FIGURE 4. When it is desired to withdraw the components, the locking sleeves 70 are grasped and pulled away from each other. However, if there is fluid pressure in the coupling, it will engage between the annular surfaces 46 and 36 and urge the two components away from each other to the position shown in FIGURE 3. At this time, the annular surface 30 of the anchor member will engage the end of the locking lever 94 and rock it to the position shown in FIGURE 3 where it will prevent outward movement of the manually operated control sleeve 70. Thus, as long as pressure exists in the coupling, the parts will be in the position of FIGURE 3 and it will be impossible to axially move the locking sleeves 70 away from each other or from the position of FIGURE 3 so as to disengage the locking means.

However, after the flow of pressure through the conduit has ceased, the spring 76 will urge each of the coupling members 20 towards its corresponding anchor member 18 so that the surfaces 46 and 36 are now in engagement as shown in FIGURES 4, 5 and 6. In this engagement, there is now sufficient clearance between the locking levers 94 and the adjacent surface 30 of the anchor member 18 to enable the locking lever to pivot as shown in FIGURES 4, 5 and 6 and permit therefore the corresponding adjacent end of the coupling member to overrun this lever as shown in FIGURE 5, thereby permitting the locking sleeve to be withdrawn and through its withdrawal to free the balls 62 so that the projections may in turn be withdrawn from the recesses. Upon complete withdrawal of the two coupling components from each other, the parts will assume the position shown in FIGURE 6 at which time the device is cocked ready for its reassembly.

The foregoing is considered as illustrative only of the principles of the invention. Further, since numerous modifications and changes will readily occur to those skilled in the art, it is not desired to limit the invention to the exact construction and operation shown and described, and accordingly all suiable modifications and equivalents may be resorted to, falling within the scope of the invention as claimed.

What is claimed as new is as follows:

1. A coupling assembly including a pair of cooperating complementary coupling components each secured to one end of one of a pair of conduit sections which are to be releasably coupled, each component including an anchor member and a coupling member slidably mounted upon said anchor member, seal means mounted by the coupling and anchor members for maintaining the coupling assembly fluid tight, retaining means mounted by the coupling member and engageable with the anchor member for retaining the anchor member within the coupling member, each coupling member having on one end thereof projections and recesses cooperatingly engageable respectively with the recesses and projections on the cooperating complementary coupling component coupling member, lock means on at least one coupling member movable into said recesses for locking engagement with locking surfaces on the projections of the cooperating coupling member, control means movably mounted on the exterior of said one coupling member and operatively engaging the corresponding lock means for holding the same in locking engagement, a pressure lock means responsive to the existence of fluid pressure within said coupling assembly when the latter is in coupled engagement for preventing operation of said control means to release said lock means, said pressure lock means including pressure surfaces on said anchor and coupling members exposed to fluid pressure in said coupling assembly and biasing said anchor and coupling members apart, said retaining means including a lock lever pivoted on one of said members and engaging the other member, the retaining means thereby preventing relative unlocking movement of the control means from locking engagement with the lock means and retaining the anchor members and coupling members in assembled relationship.

2. A coupling assembly comprising, a pair of cooperating complementary coupling components each secured to one end of one of a pair of conduit sections which are to be releasably coupled, each component including an anchor member and a coupling member slidably mounted upon said anchor member, seal means positioned between said members maintaining a fluid tight seal therebetween, each coupling member having on one end thereof projections and recesses cooperatively engageable respectively with the recesses and projections on the cooperating complementary component coupling member, the coupling members of the complementary coupling components having planar abutting surfaces, sealing elements on each coupling member engageable with the complementary coupling component and establishing a fluid tight seal between said coupling components when the latter are in their coupled engagement, lock means on at least one coupling member movable into locking engagement with the projections of the cooperating coupling member, said lock means comprising locking elements on said projections having recesses and locking balls movably mounted upon said coupling members and movable into said recesses and into engagement with said locking elements, a control means movably mounted on the exterior of said one coupling member and operatively engaging the corresponding lock means, a pressure lock means responsive to the existence of fluid pressure within said coupling assembly when the latter is in coupled engagement for preventing operation of said control means to release said lock means, said pressure lock means including pressure surfaces on said anchor and coupling members exposed to fluid pressure in said coupling assembly and biasing said anchor and coupling member apart, and a lock lever pivoted on one of said members and engaging the other and the control means thereby preventing relative unlocking movement of the control means from locking engagement with the locking balls and retaining the anchor members and coupling members in assembled relationship.

3. As one of a pair of identical coupling units for hose or the like, a control member having an annular bearing portion, a tubular coupling member enclosed by the control member and having an annular portion in sliding engagement with said bearing portion, anchor means sealingly attached to the coupling member for connecting the coupling member to a hose or the like, said coupling member having an axially exposed face, a rigid projection extending axially thereof and a cavity extending axially and located diametrically opposite the projection for receiving the projection of a cooperating coupling unit, a locking surface on the projection extending transversely thereof, a locking element extending radially inwardly from the control member into said cavity for cooperation with said locking surface of the cooperating coupling unit, an annular seal around the axis of said coupling member projecting from the axially exposed face thereof, a compression spring device disposed between said coupling member and said annular bearing portion of the control member, and retaining means detachably supported by the control member having a portion smaller than said cavity intersecting the cavity in the coupling member so as to retain said control member on said coupling member and to permit axial movement of the coupling member relative to the control member against the bias of the compression spring device.

4. The combination of claim 3 wherein said anchor means comprises an attachment member projecting from the coupling member, sealing means slidably mounting the attachment member in the coupling member for limited relative axial displacement in response to fluid pressure, a locking element movably mounted by the coupling member and engageable by the attachment member in response to said axial displacement thereof, said locking element having a portion engageable with the control member when said locking element is engaged by said attachment member for limiting said axial movement thereof against the bias of said spring device 5. A pair of cooperating coupling units for interconnecting axially spaced tends of conduits sections through which fluid under pressure is conducted, each coupling unit including, a tubular coupling member having an abutting end sealing face from which projections and cavities extend axially in opposite directions, said projections having annular locking grooves therein, locking elements carried by the coupling member for radial displacement into the cavities engaging the annular grooves of the projections from a cooperating coupling unit received in the cavities, a control member slidably mounted on the coupling member for movement from a locking position holding the locking elements within said cavities and grooves to a releasing position allowing said locking elements to move out of said grooves and pressure operated means engageable with the control member in response to fluid pressure between the end sections of the conduits coupled by the cooperating coupling units for preventing axial movement of the control member relative to the coupling member in one direction only from said locking position and means preventing movement of said control member opposite said one direction from said locking position.

6. The combination of claim 5 wherein said pressure operated means comprises, an attachment member connected to one of the conduit sections and extending into the coupling member, sealing means slidably mounting the attachment member in the coupling member for limited relative axial displacement in response to fluid pressure, a locking element movably mounted by the coupling member and engageable by the attachment member in response to said axial displacement thereof, said locking element having a portion engageable with the control member for limiting said axial movement thereof in said one direction.

References Cited
UNITED STATES PATENTS

| | | | |
|---|---|---|---|
| 792,626 | 6/1905 | Stephens | 285—320 X |
| 1,547,759 | 7/1925 | Journeay | 285—85 |
| 2,245,847 | 6/1941 | Bagby | 285—83 |
| 2,257,321 | 9/1941 | Arnold | 285—330 X |
| 2,708,589 | 5/1955 | Masek | 285—277 |
| 3,168,335 | 2/1965 | Sumption | 285—277 X |
| 3,193,211 | 6/1965 | Gordon | 285—70 |
| 3,254,673 | 6/1966 | MacKenzie | 285—70 X |

CARL W. TOMLIN, *Primary Examiner.*

D. W. AROLA, *Assistant Examiner.*